United States Patent [19]

Drewel et al.

[11] Patent Number: 5,017,111
[45] Date of Patent: May 21, 1991

[54] APPARATUS FOR CHARGING A TIRE HEATING PRESS

[75] Inventors: Günter Drewel, Seevetal; Horst Enoch; Klaus Grotkasten, both of Hamburg, all of Fed. Rep. of Germany

[73] Assignee: Fried. Krupp Gesellschaft mit beschränkter Haftung, Essen, Fed. Rep. of Germany

[21] Appl. No.: 528,413

[22] Filed: May 25, 1990

[30] Foreign Application Priority Data

Jun. 3, 1989 [DE] Fed. Rep. of Germany ....... 3918209

[51] Int. Cl.$^5$ .............................................. B29C 35/02
[52] U.S. Cl. ...................................... 425/28.1; 425/38
[58] Field of Search ...................................... 425/36, 38

[56] References Cited

U.S. PATENT DOCUMENTS

| 4,236,883 | 12/1980 | Turk et al. | 425/38 |
| 4,395,209 | 7/1983 | Singh et al. | 425/38 |
| 4,452,576 | 6/1984 | Sheerer et al. | 425/38 |
| 4,618,320 | 10/1986 | Singh | 425/38 |
| 4,800,059 | 1/1989 | Drewel et al. | 264/315 |

FOREIGN PATENT DOCUMENTS

| 0092598 | 4/1982 | European Pat. Off. |
| 0099326 | 7/1983 | European Pat. Off. |
| 3325693 | 8/1985 | Fed. Rep. of Germany |
| 3438911 | 9/1986 | Fed. Rep. of Germany |
| 3603076 | 8/1987 | Fed. Rep. of Germany |
| 3802777 | 9/1989 | Fed. Rep. of Germany |

Primary Examiner—Willard E. Hoag
Attorney, Agent, or Firm—Spencer & Frank

[57] ABSTRACT

A tire press for vulcanizing a tire includes two rotationally symmetrical vulcanizing tools which are situated inside the tire in the working position thereof and which have a tool diameter greater than the diameter of the tire. The tire press further includes an apparatus for introducing the tire into the tire press. The apparatus has a carrier; a moving and guiding mechanism for displacing the carrier parallel to the press axis and also in a plane perpendicular to the press axis between a tire-receiving position and a position at the vulcanizing tools; an auxiliary frame mounted on the carrier to be pivotal with respect thereto about an axis perpendicular to the press axis; and a tool mounted on the auxiliary frame for grasping one of the two tire beads. There are further provided spreading arms attached to the auxiliary frame; spreading shoes mounted on the spreading arms for grasping the other of the two tire beads; and a mechanism for moving the spreading arms away from one another to a distance exceeding an outer diameter of the tire.

4 Claims, 3 Drawing Sheets

APPARATUS FOR CHARGING A TIRE HEATING PRESS

CROSS-REFERENCE TO RELATED APPLICATION

This application claims the priority of Federal Republic of Germany application No. P 39 18 209.6, filed Jun. 3rd, 1989, which is incorporated herein by reference.

BACKGROUND OF THE INVENTION

The present invention relates to an apparatus for introducing a tire blank into a tire heating press and/or for removing a tire therefrom. The apparatus includes two rotationally symmetrical tools whose diameter is larger than the inner diameter of the tire blank or tire and which are provided for vulcanization within the tire blank. Such a tire heating press is designed, for example, for vulcanizing a pneumatic motor vehicle tire having interior sealing faces; the tire heating press is provided with upper and lower undivided contour rings for vulcanizing a sealing face disposed on the interior of the tire bead.

Pneumatic vehicle tires, when mounted, engage with their two sealing faces the respective two sides of the wheel rim. To achieve a satisfactory seal, the sealing faces must have a defined shape and a sufficiently smooth surface.

Conventional rims each have a left and a right cylindrical contact surface, each provided with a lateral outer delimiting flange. The corresponding sealing faces on the tire are accordingly disposed at the outer face, that is, at the surface which, during the vulcanizing process, is necessarily gripped by the shaping members of a tire heating press.

In more up-to-date wheel and tire systems, the radial contact face of the rim has a hollow cylindrical configuration, that is, it has surfaces which are oriented radially inwardly relative to the rotation axis. On the exterior, the radial contact faces are each adjoined by a lateral delimiting flange. The sealing faces of the tire are correspondingly arranged along the interior of its two bead edges.

Tire heating presses for vulcanizing conventional tires include upper and lower tire shaping tools which surround the exterior surface of the tire blank during heating. Generally, the upper tire shaping tool can be moved away from the lower tire shaping tool by means of hydraulic cylinders. For introducing the tire blank, a charging device pivots the tire blank into the tire heating press, while the tire shaping tools are separated. During this procedure, the tire is being held at the interior of its upper bead by pivotal carrying jaws which are disposed at a pivotal holder and then the tire is taken over by spreadable holding bars provided at the upper shaping tool. Such an arrangement is disclosed in German patent document No. 3,603,076 to which corresponds U.S. Pat. No. 4,800,059.

Tire heating presses for pneumatic motor vehicle tires of up-to-date tire systems have, for forming the sealing faces in the interior of the tire, an upper and a lower undivided contour ring whose diameter is larger than the inner diameter of the tire blank, as disclosed in German patent document No. 3,802,777. Therefore, tire blanks cannot be introduced by means of conventional tire charging devices into tire heating presses equipped with such contour rings.

SUMMARY OF THE INVENTION

It is an object of the invention to provide an improved tire charging apparatus which is able to introduce a tire blank into a tire heating press and/or remove a tire therefrom and which includes two rotationally symmetrical inner vulcanizing tools whose diameter is larger than the inner diameter of the tire blank and of the tire (inner diameter of the bead).

This object and others to become apparent as the specification progresses, are accomplished by the invention, according to which, briefly stated, the tire press for vulcanizing a tire includes two rotationally symmetrical vulcanizing tools which are situated inside the tire in the working position thereof and which have a tool diameter greater than the diameter of the tire. The tire press further includes an apparatus for introducing the tire into the tire press. The apparatus has a carrier; a moving and guiding mechanism for displacing the carrier parallel to the press axis and also in a plane perpendicular to the press axis between a tire-receiving position and a position at the vulcanizing tools; an auxiliary frame mounted on the carrier to be pivotal with respect thereto about an axis perpendicular to the press axis; and a tool mounted on the auxiliary frame for grasping one of the two tire beads. There are further provided spreading arms attached to the auxiliary frame; spreading shoes mounted on the spreading arms for grasping the other of the two tire beads; and a mechanism for moving the spreading arms away from one another to a distance exceeding an outer diameter of the tire, whereby the spreading arms are movable past the tire in the working position without contacting the same and for moving the spreading arms towards one another to an extent as to allow introduction of the spreading shoes into a tire opening defined by last-named tire bead.

The spreading arms can deform the tire blank at its lower bead to such an extent that the tire can be moved — in an oblique position — over the rotationally symmetrical tool in the tire heating press. In order to tilt the tire blank, the auxiliary frame, the tool for gripping the tire blank and the spreading device are mounted so as to be pivotal as a unit.

As a further feature of the invention, pivot bearings are provided for the required movements of the individual parts of the apparatus so as to ensure simple and safe manipulation.

DESCRIPTION OF THE PREFERRED EMBODIMENT

Figure 1:
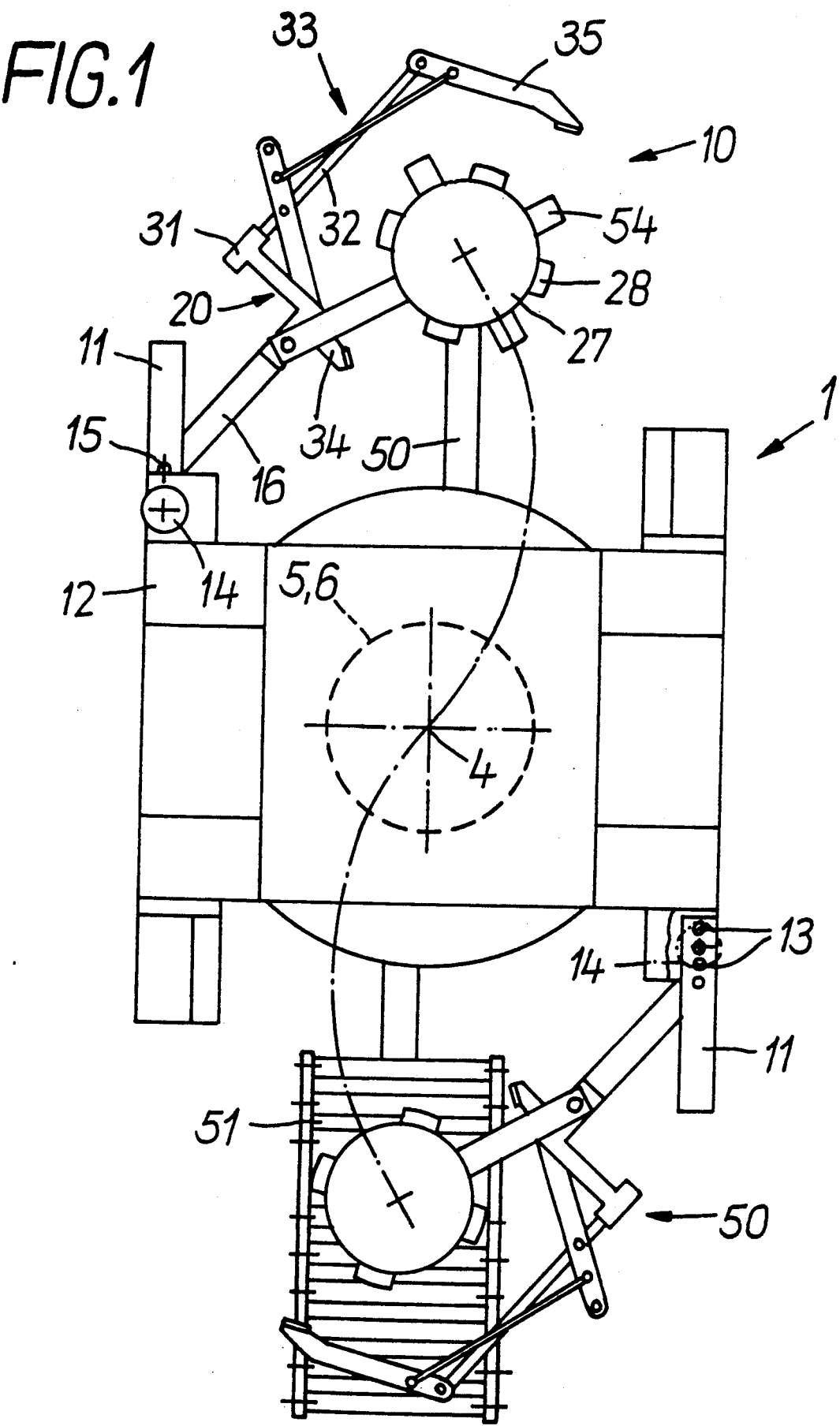
FIG. 1 is a schematic top plan view of the tire heating press including a charging and removal device, according to a preferred embodiment.
Figure 2:
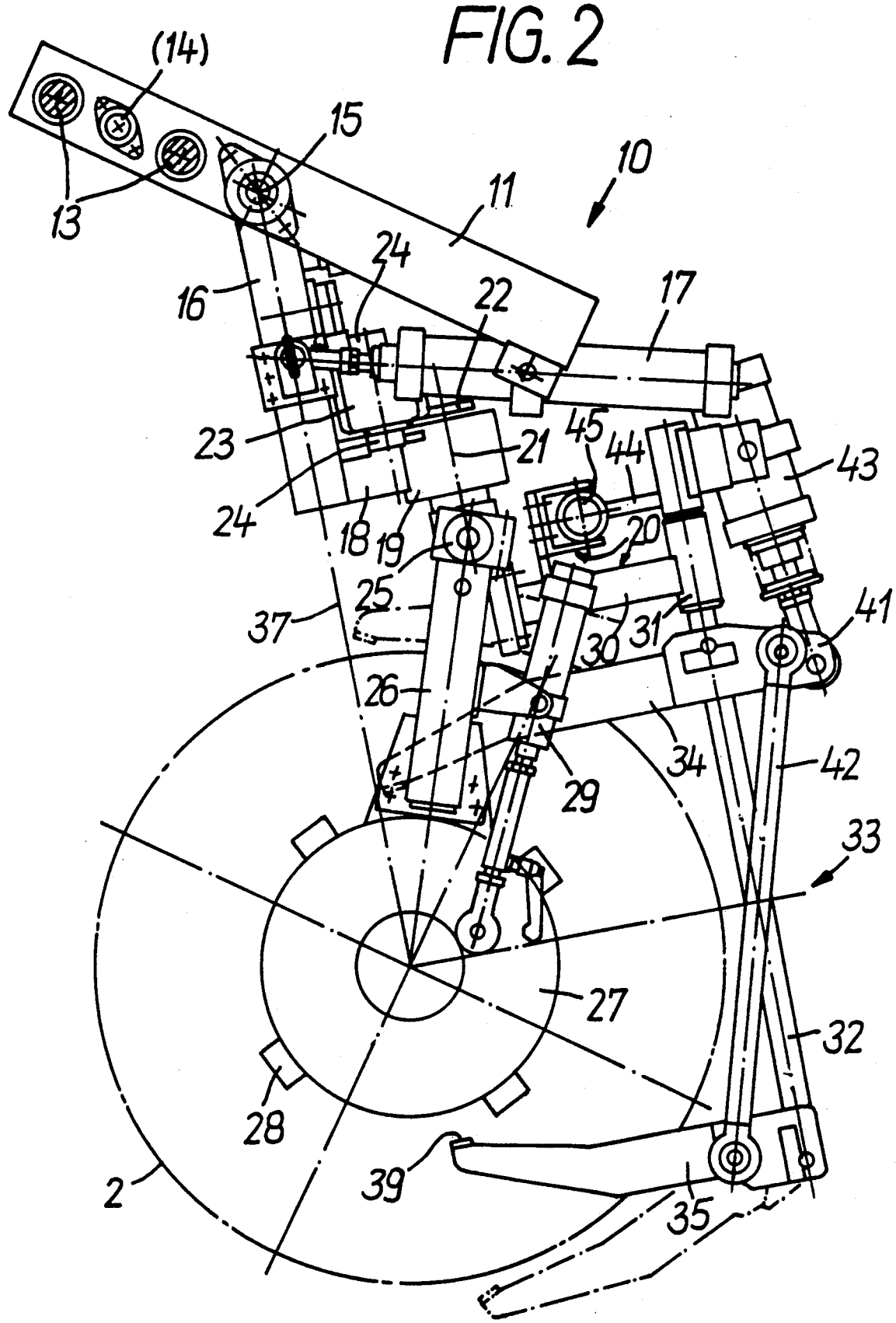
FIG. 2 is a schematic enlarged top plan view of the charging device of the preferred embodiment illustrating further details.

Turning to FIGS. 1 and 2, the tire heating press 1 for vulcanizing a pneumatic motor vehicle tire 2 having interior sealing faces includes a vertical press axis 4 along which an upper contour ring 5 and a lower contour ring 6 are movable and about which further shaping tools (not shown) for vulcanizing the tire are arranged in rotational symmetry. Contour rings 5 and 6 have a larger diameter than the inner diameter of the tire beads. The tire heating press may be, for example, of the type disclosed in German patent document No. 3,802,777.

A tire-introducing device 10 is carried in its entirety by a holder 11 which is vertically slidably guided along two vertical guide columns 13 fastened to a press frame 12 and which is vertically movable by means of a pressure medium cylinder (lifting cylinder) 14.

Charging device 10 includes an angular carrier 16 which is pivotal at holder 11 about a vertical axis 15 by means of a pressure medium cylinder (pivoting cylinder) 17 articulated to holder 11. Angular carrier 16 is provided with a downwardly oriented angle arm 18 and a bearing 19 in which an auxiliary frame 20 is mounted so as to be pivotal about a horizontal rotation axis 21.

At its one end, auxiliary frame 20 is provided with a radially disposed lever 22 which is connected with the piston rod of a pressure medium cylinder 23 that, in turn, is articulated at bearing locations 24 disposed at angular carrier 16. Auxiliary frame 20 includes a holder 25 which, in the basic position, is oriented upwardly and to which is fastened a gripper arm 26 whose height and orientation are adjustable. Gripper arm 26 is provided with a circular plate 27 provided with gripper shoes 28 which are radially pivotal by means of a pressure medium cylinder 29 articulated to gripper arm 26. Such an arrangement is disclosed, for example in European Patent No. 092,598 to which corresponds U.S. Pat. No. 4,547,012.

Figure 4:
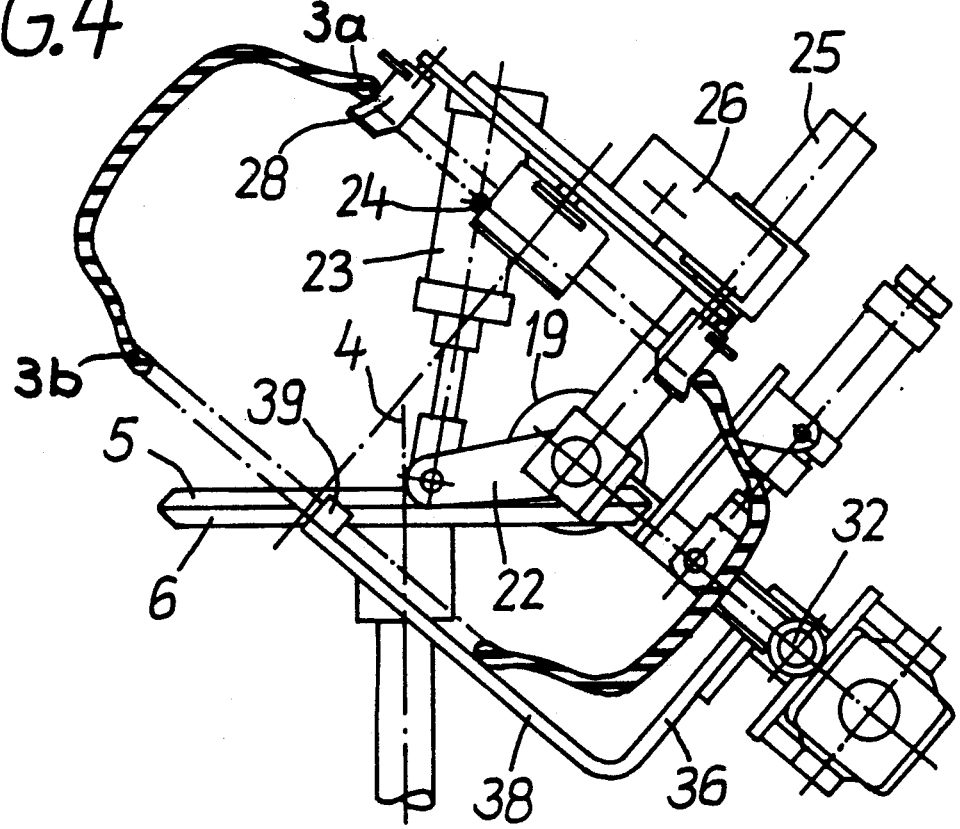
FIG. 4 is a schematic front elevational view of the charging device depicted during introduction of the tire blank over axially pulled-together contour rings of the tire heating press.

Auxiliary frame 20 is also provided with a horizontal cantilever arm 30 including a pivot bearing 31 in which the shaft 32 of a spreading device 33 is mounted. Two spreading arms 34 and 35 are pivotally mounted on the shaft 32. As seen in FIG. 4, each spreading arm 34, 35 has a downwardly oriented part 36 adjoined by a portion 38 which is oriented toward the (imaginary) vertical center plane 37 of charging device 10.

At their free ends, spreading arms 34, 35 are provided with upwardly directed spreading jaws 39. The spreading arm 34 facing bearing 31 has an extension 41 which projects beyond the shaft 32 and which is hinged to a coupling rod 42 whose other end is connected with the other spreading arm 35. The free end of extension 41 is articulated to the piston rod of a pressure medium cylinder (spreading cylinder) 43 which, in turn, is articulated to the shaft 32. A displacement of the piston rod outwardly of the cylinder 43 causes the space between the spreading jaws 39 to be enlarged (see FIG. 1 and the dot-dash illustration in FIG. 2), whereas a retraction of the piston rod causes spreading arms 34, 35 to move back into their basic position (see FIG. 2).

Figure 3:
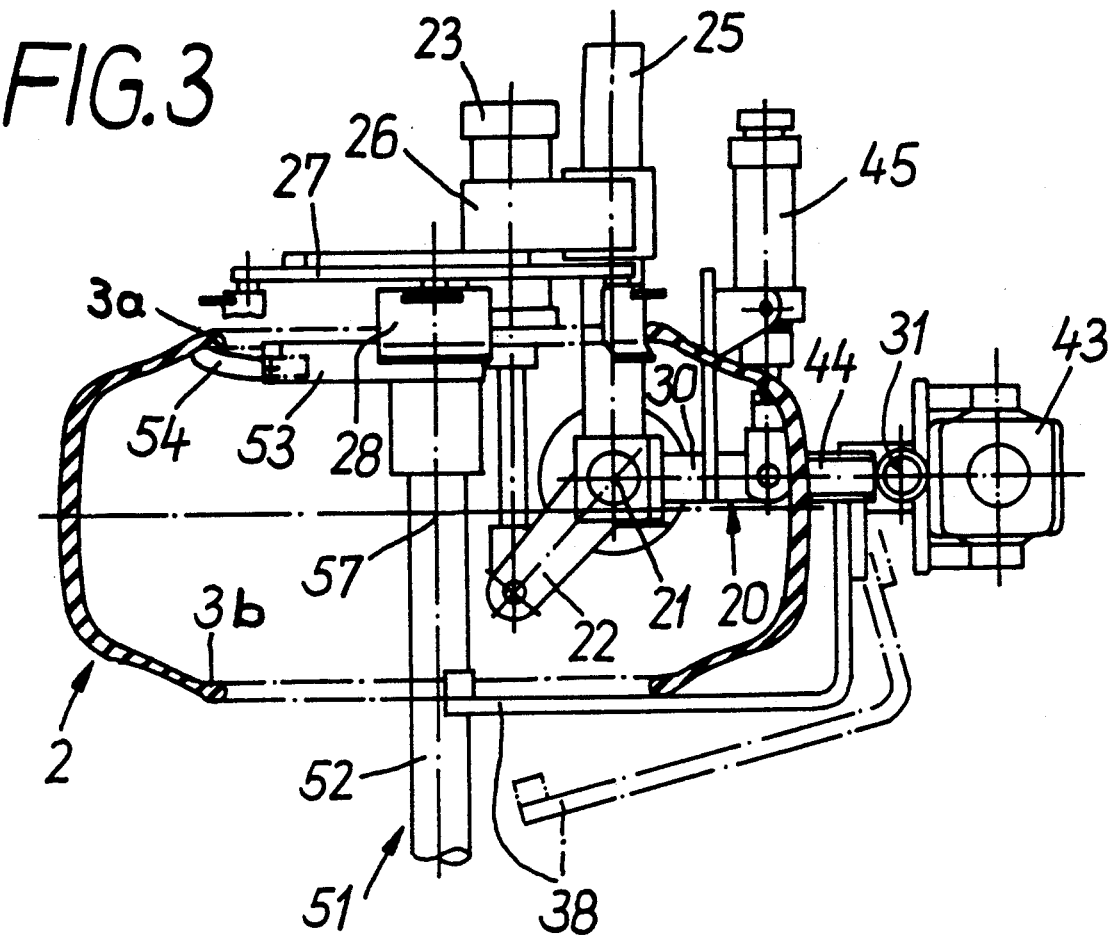
FIG. 3 is a schematic front elevational view of the charging device, depicted while gripping a tire blank.

The entire spreading device 33, formed of shaft 32, spreading arms 34, 35 and spreading cylinder 43, is pivotal by a lever 44 fastened to the shaft 32 and actuated by means of a pressure medium cylinder (tilt cylinder) 45 hinged to auxiliary frame 20 so that the lower horizontal part 38 of spreading arms 34, 35 can be moved from their position shown in solid lines in FIG. 3 to the lowered position shown in dot-dash lines. Shaft 32 is disposed parallel to axis 21.

On the other side of the tire heating press, there is provided a discharging device similar in construction to the charging device and including a depository 51 formed of a roller conveyor for the finished, vulcanized tires.

In order for charging device 10 to receive a tire blank 2, the latter is first placed manually onto a blank holder or stand 51 which is connected with press frame 12 by means of a cantilever arm 50, while the blank holder 51 — when seen in top view — is in the receiving position. Blank holder 51 includes a plate 53 fastened to a column 52 and having a diameter which is smaller than the inner diameter of the beads 3a and 3b of tire blank 2 (see FIG. 3). Plate 53 is provided with radially arranged fingers or pawls 54 which, when pivoted outwardly, define an (imaginary) circumference whose diameter is larger than the inner diameter of the tire beads. Pawls 54 can be pivoted upwardly without noticeable resistance.

In order for charging device 10 to receive a tire blank 2 from blank holder 51, spreading cylinder 43 moves spreading arms 34, 35 apart to such an extent that, when moving vertically, they are able to pass tire blank 2 without touching it (see FIG. 2). Additionally, tilting cylinder 45 pivots spreading arms 34, 35 downwardly away into the position shown with dash-dot lines in FIG. 3.

Charging device 10 is then moved downwardly as a whole with — with gripper shoes 28 retracted — until gripper shoes 28 enter into tire blank 2. Gripper shoes 28 are arranged along the circumference at an angular offset relative to pawls 43 of blank holder 51 (see FIG. 1). Gripper pawls 28 are spread outwardly by pressure medium cylinder 29 so that they grip the upper bead 3a of tire blank 2. Spreading arms 34, 35 are moved toward one another until spreading jaws 39, when pivoted upwardly, project into the opening defined by the lower bead 3b of the tire blank 2.

Thereafter, lifting cylinder 14 lifts the entire charging device 10. Auxiliary frame 20 including spreading device 33 is tilted about axis 21 so that the portion of tire blank 2 facing tire heating press 1 is at a higher level than the remaining portion of the tire blank. Spreading arms 34, 35 are moved apart so that they approximately elliptically deform the lower tire bead 3b. Spreading arms 34, 35 are moved apart to such an extent that the longitudinal axis of the elliptical shape is larger than the outer diameter of contour rings 5, 6 of tire heating press 1.

Charging device 10 is moved upwardly to such an extent that spreading jaws 39 and the bead — with spreading device 33 tilted — when pivoted into press 1, have the same height as the average height of contour rings 5, 6, and tire blank 2 is pivoted into the press 1 in the angled position (see FIG. 4).

Then, auxiliary frame 20 and spreading device 33 are pivoted back by the pressure cylinder 23 into the basic horizontal position within press 1 in which the center of gravity 57 of the tire blank is disposed on the vertical center axis 4 of tire heating press 1 and at the common, average height of contour rings 5, 6.

Subsequently, spreading arms 34, 35 are moved toward one another (so that the tire blank again assumes its circular basic position), lowered by tilting cylinder 43, spread by spreading cylinder 45 and raised again.

The charging device 10 as a whole is lowered to such an extent that the tire blank 2, which is, at that time, held only by gripper shoes 28, can be transferred to the upper contour ring 5 once gripper shoes 28 have been pivoted inwardly.

Finally, charging device 10 is raised and returned to the receiving position.

It will be understood that the above description of the present invention is susceptible to various modifications, changes and adaptations, and the same are intended to be comprehended within the meaning and range of equivalents of the appended claims.

What is claimed is:

1. In a tire press for vulcanizing a tire having a tire axis and axially spaced and aligned first and second circular tire beads having a bead diameter measured diametrically relative to the tire axis; the tire press having a press axis and being arranged to receive the tire in a working position in which the tire axis substantially coincides with the press axis; the tire press further having two rotationally symmetrical vulcanizing tools situated inside the tire in the working position thereof and having a tool diameter greater than said bead diameter; the improvement wherein said tire press has an apparatus for introducing the tire in the working position; said apparatus including
   (a) a carrier;
   (b) moving means for displacing said carrier parallel to said press axis and for displacing said carrier in a plane perpendicular to said press axis between a tire-receiving position and a position at said vulcanizing tools;
   (c) an auxiliary frame mounted on said carrier to be pivotal with respect thereto about an axis perpendicular to said press axis;
   (d) tool means mounted on said auxiliary frame for grasping the first tire bead;
   (e) spreading arms attached to said auxiliary frame;
   (f) spreading shoes mounted on said spreading arms for grasping the second tire bead; and
   (g) means for moving the spreading arms away from one another to a distance exceeding an outer diameter of the tire, whereby said spreading arms are movable past the tire in the working position without contacting the same and for moving the spreading arms towards one another to an extent as to allow introduction of said spreading shoes into a tire opening defined by said second bead.

2. A tire press as defined in claim 1, wherein said carrier is pivotal about an axis oriented parallel to said press axis.

3. A tire press as defined in claim 3, further comprising pivot means for simultaneously pivoting said spreading arms towards or away from one another.

4. A tire press as defined in claim 1, further wherein said spreading arms are pivotal as a unit about an axis perpendicular to said press axis.

* * * * *